US012347406B2

(12) United States Patent
Redmon

(10) Patent No.: US 12,347,406 B2
(45) Date of Patent: Jul. 1, 2025

(54) DRUM TUNING STICK WITH MULTI-TOOL TUNING KEY

(71) Applicant: Wayne Redmon, Burnsville, NC (US)

(72) Inventor: Wayne Redmon, Burnsville, NC (US)

( * ) Notice: Subject to any disclaimer, the term of this patent is extended or adjusted under 35 U.S.C. 154(b) by 242 days.

(21) Appl. No.: 18/360,763

(22) Filed: Jul. 27, 2023

(65) Prior Publication Data

US 2025/0037686 A1 Jan. 30, 2025

(51) Int. Cl.
*G10D 13/16* (2020.01)

(52) U.S. Cl.
CPC .................................... *G10D 13/16* (2020.02)

(58) Field of Classification Search
CPC ...................................................... G10D 13/16
See application file for complete search history.

(56) References Cited

U.S. PATENT DOCUMENTS 4,208,942 A * 6/1980 Henrit .................... G10D 13/16
984/258
D346,100 S * 4/1994 Behrenfeld .................... D17/22
7,244,882 B1 * 7/2007 Colwell ................. G10D 13/02
84/411 R
8,658,875 B2 * 2/2014 Albright ................ G10D 13/02
84/411 R
10,643,588 B1 * 5/2020 Doherty ................. G10D 13/16
2007/0193433 A1 * 8/2007 Takegawa .............. G10D 13/16
84/413
2017/0365241 A1 * 12/2017 Jones ...................... G10D 13/16
2022/0020345 A1 * 1/2022 Gorman ................. G10D 13/02
2022/0375439 A1 * 11/2022 Rodabough ............ G10D 13/16
2023/0339090 A1 * 10/2023 Harris ........................ B25F 1/00
2025/0037686 A1 * 1/2025 Redmon .................. G10D 3/14
2025/0046277 A1 * 2/2025 Latos ...................... G10D 13/16

* cited by examiner

*Primary Examiner* — Robert W Horn
(74) *Attorney, Agent, or Firm* — Coffield Heedy Kilgore PLLC; William Heedy

(57) ABSTRACT

A drum tuning stick includes a shaft having a proximal end and a distal end; a grip section located near the proximal end of the shaft; a multi-tool tuning key including a main body having a top end and a bottom end; the top end of the main body including a first tool, a second tool and a third tool extending therefrom; and the bottom end of the main body forming a tuning key; and a receptacle formed at the grip section, the receptacle being sized and configured for receiving the multi-tool tuning key.

18 Claims, 5 Drawing Sheets

DRUM TUNING STICK WITH MULTI-TOOL TUNING KEY

FIELD OF THE INVENTION

This invention relates to a drum tuning stick that incorporates multiple functional features, including a multi-tool tuning key that is selectively detachable.

BACKGROUND OF THE INVENTION

Drum tuning is an essential aspect of achieving optimal sound quality and performance from a drum kit. Among the various tools used by drummers and percussionists, the tuning key stands out as a fundamental instrument for tuning drums. Tuning keys are small, T-shaped tools that traditionally fit into the tension rods of a drum's drumhead. By turning these tension rods clockwise or counterclockwise, drummers can adjust the tension on the drumhead, which directly impacts the pitch and tone of the drum.

Using tuning keys for tuning drums offers several advantages. Firstly, it provides drummers with precise control over the drum's pitch, allowing them to customize the sound according to their musical preferences and the specific requirements of the music they are playing. Additionally, tuning keys are portable and lightweight, which, while making them a convenient tool to carry during gigs and rehearsals, results in them often being misplaced.

Therefore, there exists a need for a drum tuning stick including a selectively detachable tuning key providing the versatility to drummers to enable them to make quick adjustments on the fly, ensuring their drums remain in tune even during performance, while also ensuring that the tuning key is readily available in its stored position on the drummers' drum tuning sticks.

SUMMARY OF THE INVENTION

In accordance with one form of this invention, there is provided a drum tuning stick including a shaft having a proximal end and a distal end; a bulbous grip section located near the proximal end of the shaft; an enlarged tip section located at the distal end of the shaft; a multi-tool tuning key including a main body having a top end and a bottom end; the top end of the main body including a first chuck, a second chuck and a third chuck extending therefrom, each of the first, second and third chucks being sized and configured for interchangeable receipt of a tool; and the bottom end of the main body forming a tuning key; a tuning key receptacle formed at the bulbous grip section, the tuning key receptacle being structured and disposed for receiving the multi-tool tuning key in a stowed configuration; a strap member that is structured and disposed for releasably securing the multi-tool tuning key in the tuning key receptacle for storage; a notch formed at the proximal end of the shaft, the notch being structured and disposed for loosening wingnuts; and a first channel and a second channel formed on the shaft between the tuning key receptacle and the distal end of the shaft, the first and second channels each being sized and configured for passage therethrough of snare wires for adjusting tension on snare strainers.

In accordance with another form of this invention, there is provided a drum tuning stick including a shaft having a proximal end and a distal end; a grip section located near the proximal end of the shaft; a multi-tool tuning key including a main body having a top end and a bottom end; the top end of the main body including a first tool, a second tool and a third tool extending therefrom; and the bottom end of the main body forming a tuning key; a receptacle formed at the grip section, the receptacle being sized and configured for receiving the multi-tool tuning key; a strap member that is structured and disposed for releasably securing the multi-tool tuning key in the tuning key receptacle for storage; a notch formed at the proximal end of the shaft, the notch being structured and disposed for loosening wingnuts; and a first channel and a second channel formed on the shaft between the tuning key receptacle and the distal end of the shaft, the first and second channels each being sized and configured for passage therethrough of snare wires for adjusting tension on snare strainers.

In accordance with another form of this invention, there is provided a drum tuning stick including a shaft having a proximal end and a distal end; a grip section located near the proximal end of the shaft; a multi-tool tuning key including a main body having a top end and a bottom end; the top end of the main body including a first tool, a second tool and a third tool extending therefrom; and the bottom end of the main body forming a tuning key; and a receptacle formed at the grip section, the receptacle being sized and configured for receiving the multi-tool tuning key.

BRIEF DESCRIPTION OF THE DRAWINGS

For a fuller understanding of the nature of the present invention, reference should be made to the following detailed description, taken in conjunction with the accompanying drawings in which.

Like reference numerals refer to like reference parts throughout the several views of the drawings.

DETAILED DESCRIPTION

Figure 1:
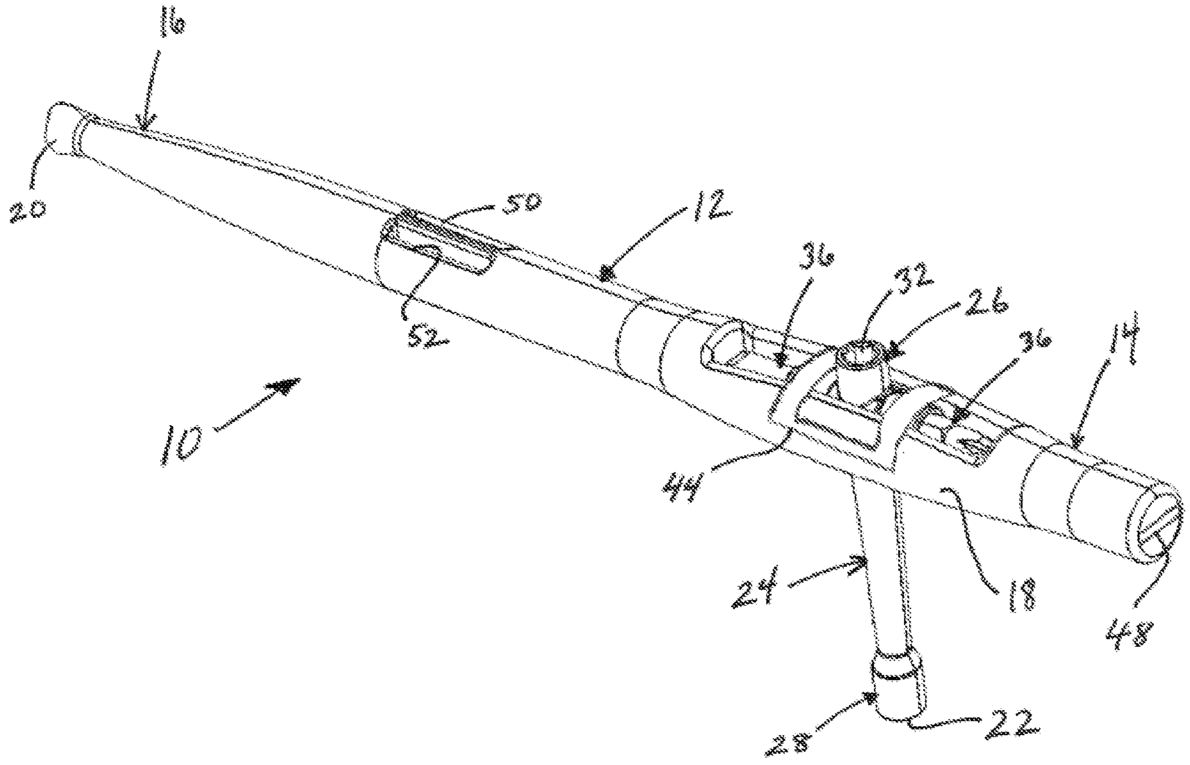
FIG. 1 is a perspective view of a drum tuning stick, according to one embodiment.
Figure 2:
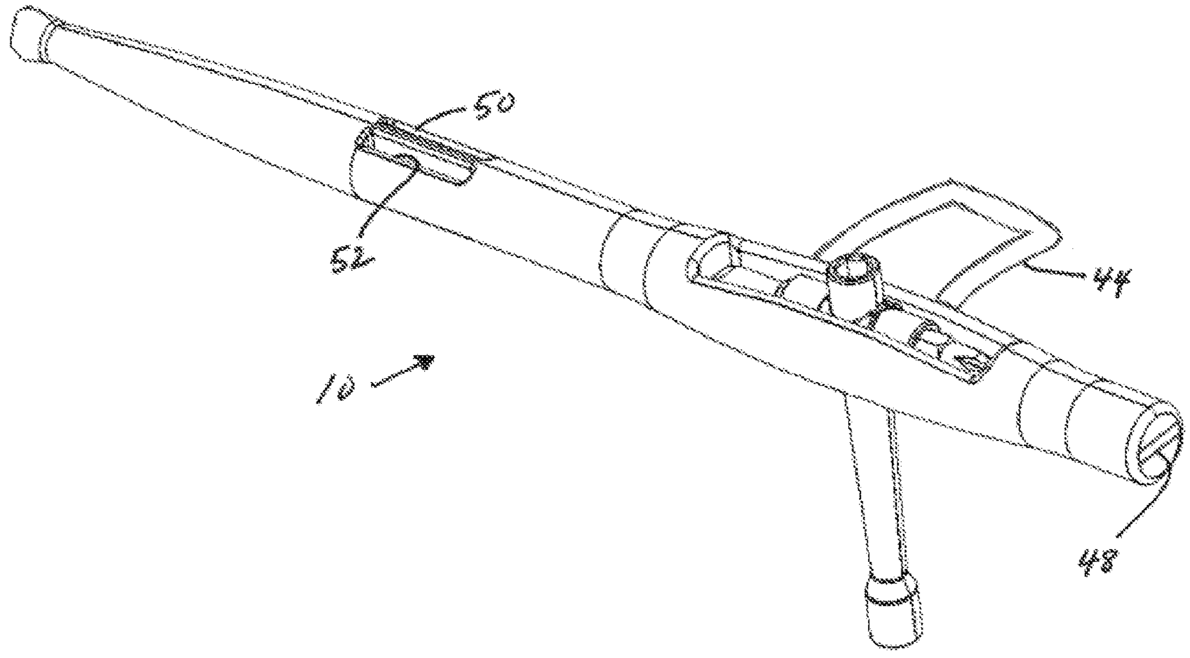
FIG. 2 is a perspective view thereof.
Figure 3:
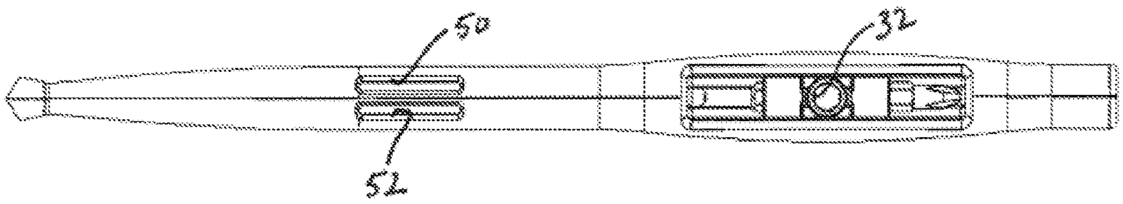
FIG. 3 is a top plan view thereof.
Figure 4:
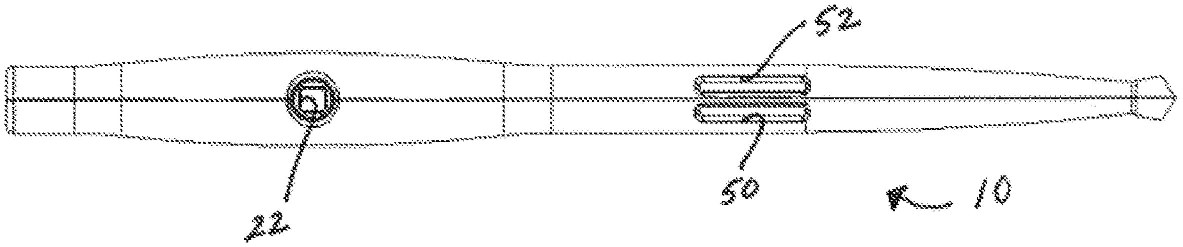
FIG. 4 is a bottom plan view thereof.

Referring to the several views of the drawings, a drum tuning stick 10 is shown and described herein.

With reference to FIGS. 1-4, the drum tuning stick 10 includes a shaft 12. The shaft 12 may be formed from wood, plastic, or other suitable material. The shaft 12 includes a proximal end 14 and a distal end 16. A grip section 18 is located near the proximal end 14 of the shaft 12. The grip section 16 may be bulbous in shape. An enlarged tip section 20 is located at the distal end 16 of the shaft 12.

Figure 7:
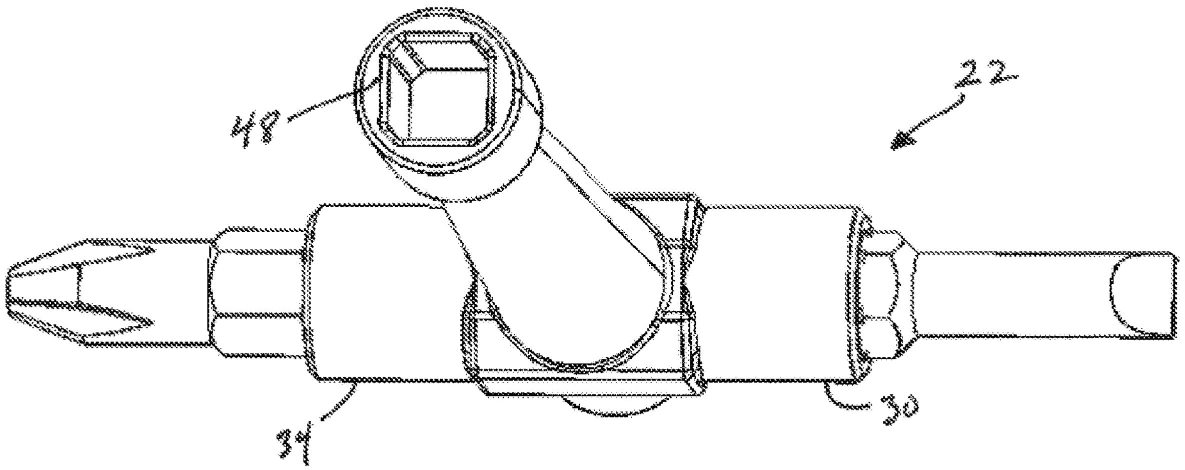
FIG. 7 is a bottom perspective view of the tuning key.
Figure 8:
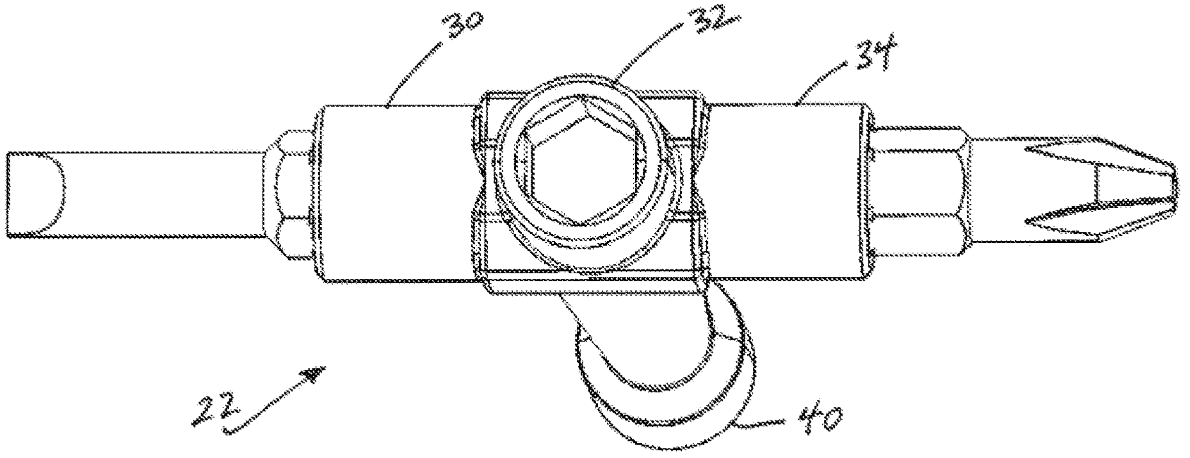
FIG. 8 is a top perspective view thereof.

Referring now to FIGS. 5-8, the drum tuning stick 10 includes a multi-tool tuning key 22. The multi-tool tuning key 22 has a main body 24 including a top end 26 and a bottom end 28. The top end 26 of the main body 28 includes a first chuck 30, a second chuck 32 and a third chuck 34 extending therefrom. Each of the first chuck 30, second chuck 32 and third chuck 34 forms the base of a tool 36, such as a Phillips screw head, a flathead or a socket, wherein each of the first, second and third chucks 30, 32, and 34 is sized and configured for interchangeable receipt of a tool bit 38. The tool bits 38 may form a screwdriver head bits, such as a Phillips screw head or a flathead bits, or a driver bit and socket, for forming the tool 36. Each of the chucks 30-34 may be a ¼" chuck or similar. In some embodiments, each tool 36 may be integrally formed with the main body 24 and not removable therefrom. The bottom end 28 of the main body 24 forms a tuning key 40, as shown in FIG. 7.

Figure 5:
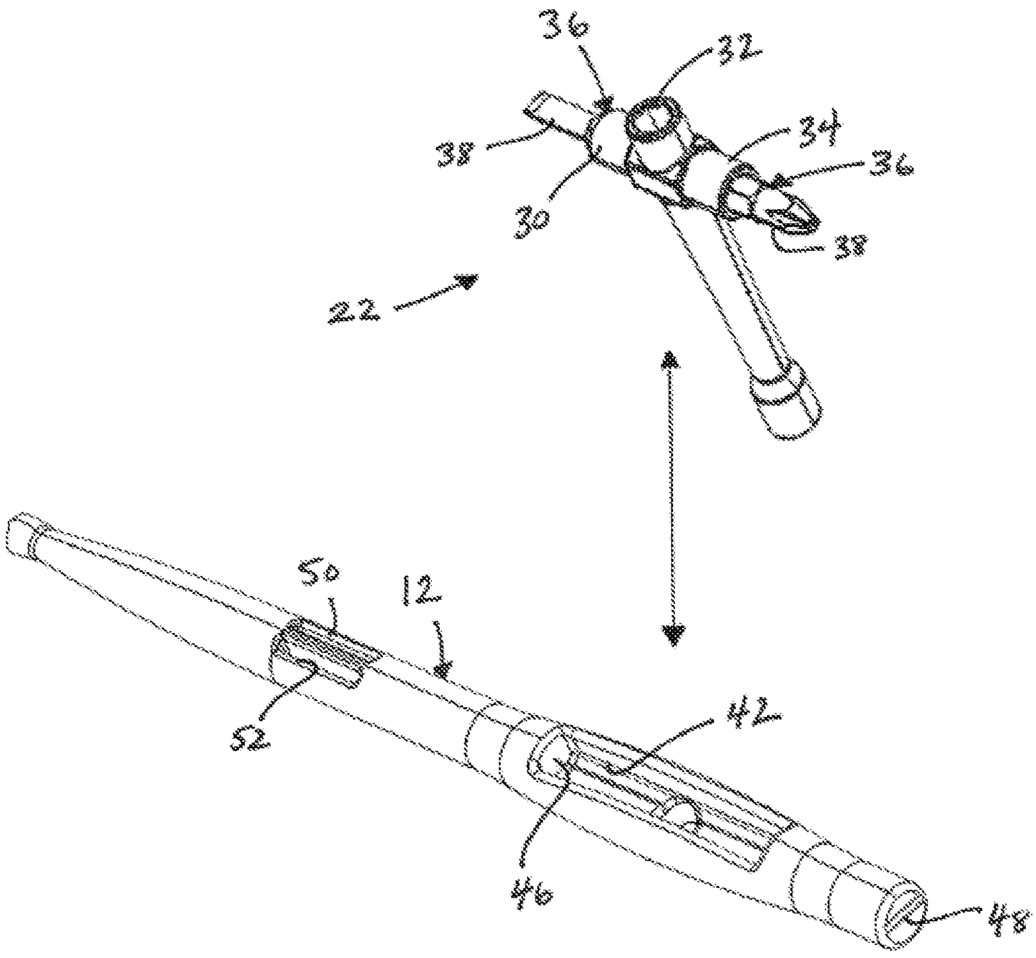
FIG. 5 is a partially exploded perspective view thereof.
Figure 6:
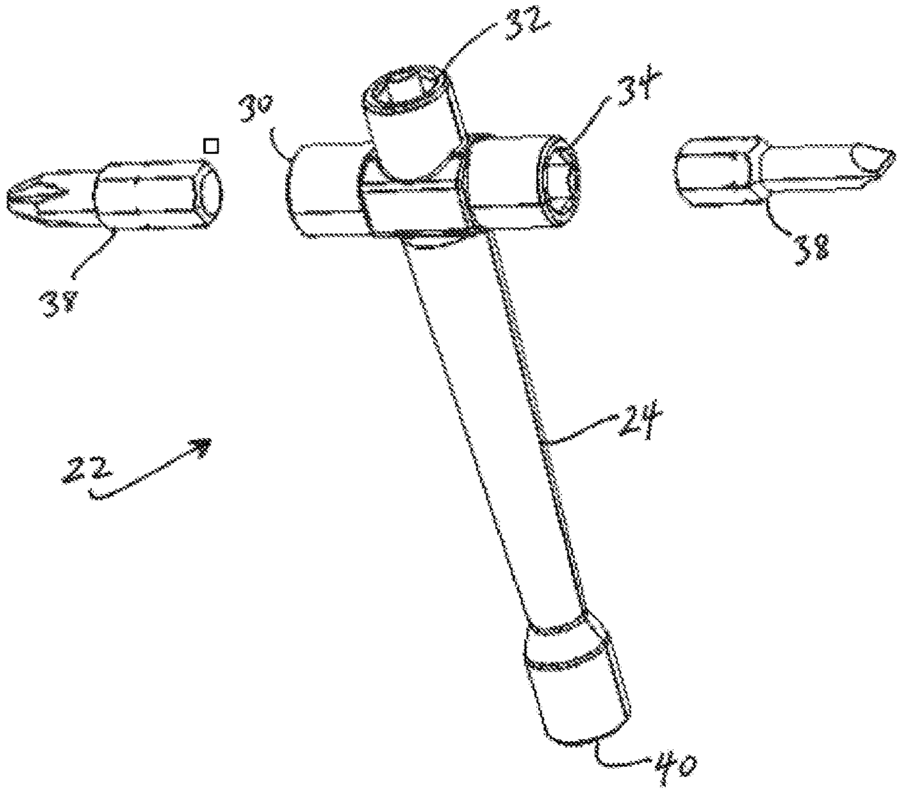
FIG. 6 is an exploded perspective view of the tuning key.

With reference to FIG. 5, a tuning key receptacle 42 is formed at the grip section 18. The tuning key receptacle 42 is structured and disposed for receiving the multi-tool tuning key in a stowed configuration (as shown in FIGS. 1-4). It is preferred the top end 26 of the multi-tool tuning key 22 is approximately flush with the grip section 18 when in the stowed configuration to facilitate ergonomic maneuverability of the drum tuning stick 10 by a user who is tuning a drum kit. The user may selectively orient his or her wrist and hand while holding the drum tuning stick 10 to either use the tip section 20 (for tapping the drum) or the exposed tuning key 40 (for adjusting tension) with minimal change in grip position about the drum tuning stick 10 while holding a tuning reader device in the opposite hand while tuning a drum kit. The length of the main body 24 is longer than a standard shaft of a tuning key so that the bottom end 28 of the main body 24 is exposed when the multi-tool tuning key 22 is in the stowed configuration to enable use of the tuning key 40.

When in the stowed configuration, one or more strap members 44 are provided for releasably securing the multi-tool tuning key 22 in the tuning key receptacle 42 for storage. Hook and loop members or other attachment members may be used for securing the strap members 44 to the shaft 12. Alternatively, one or more magnets 46 adjacent the tuning key receptacle 42 may be used for securing the multi-tool tuning key 22 in the stowed configuration.

A notch 48 formed at the proximal end 14 of the shaft 12 may be included for tightening and loosening wingnuts when tuning a drum kit. Additionally, a first channel 50 and a second channel 52 formed on the shaft 12 between the tuning key receptacle 42 and the distal end 16 of the shaft 12 may be included for passage therethrough of snare wires for adjusting tension on snare strainers.

While the present invention has been shown and described in accordance with several preferred and practical embodiments, it is recognized that departures from the instant disclosure are contemplated within the spirit and scope of the present invention.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

It will be further understood that the terms "includes," "comprises," "including," and/or "comprising" specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms "includes," "has" or "having" or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the subject invention. While examples of aspects of the subject invention have been provided above, it is not possible to describe every conceivable combination of components or methodologies for implementing the subject invention, and one of ordinary skill in the art may recognize that further combinations and permutations of the subject invention are possible. Furthermore, the subject invention is not necessarily limited to implementations that solve any or all disadvantages which may have been noted in any part of this disclosure. Various modifications and changes may be made to the subject invention described herein without following, or departing from the spirit and scope of, the exemplary embodiments and applications illustrated and described herein. Although the subject matter presented herein has been described in language specific to components used therein, it is to be understood that the subject invention is not necessarily limited to the specific components or characteristics thereof described herein; rather, the specific components and characteristics thereof are disclosed as example forms of implementing the subject invention. Accordingly, the disclosed subject matter is intended to embrace all alterations, modifications, and variations, that fall within the scope and spirit of any claims that are written, or may be written, for the subject invention.

What is claimed is:

1. A drum tuning stick comprising:

a shaft having a proximal end and a distal end;

a bulbous grip section located near the proximal end of the shaft;

an enlarged tip section located at the distal end of the shaft;

a multi-tool tuning key including a main body having a top end and a bottom end; the top end of the main body including a first chuck, a second chuck and a third chuck extending therefrom, each of the first, second and third chucks being sized and configured for interchangeable receipt of a tool bit to form a tool; and the bottom end of the main body forming a tuning key;

a tuning key receptacle formed at the bulbous grip section, the tuning key receptacle being structured and disposed for receiving the multi-tool tuning key in a stowed configuration;

a strap member that is structured and disposed for releasably securing the multi-tool tuning key in the tuning key receptacle for storage;

a notch formed at the proximal end of the shaft, the notch being structured and disposed for loosening wingnuts; and a first channel and a second channel formed on the shaft between the tuning key receptacle and the distal end of the shaft, the first and second channels each being sized and configured for passage therethrough of snare wires for adjusting tension on snare strainers.

2. The drum tuning stick as recited in claim 1 wherein the first chuck is a ¼" chuck.

3. The drum tuning stick as recited in claim 1 wherein the second chuck is a ¼" chuck.

4. The drum tuning stick as recited in claim 1 wherein the third chuck is a ¼" chuck.

5. The drum tuning stick as recited in claim 1 wherein the tool bit comprises a screwdriver head or a socket.

6. A drum tuning stick comprising:

a shaft having a proximal end and a distal end;

a grip section located near the proximal end of the shaft;

a multi-tool tuning key including a main body having a top end and a bottom end; the top end of the main body including a first tool, a second tool and a third tool extending therefrom; and the bottom end of the main body forming a tuning key;

a receptacle formed at the grip section, the receptacle being sized and configured for receiving the multi-tool tuning key;

a strap member that is structured and disposed for releasably securing the multi-tool tuning key in the tuning key receptacle for storage;

a notch formed at the proximal end of the shaft, the notch being structured and disposed for loosening wingnuts; and a first channel and a second channel formed on the shaft between the tuning key receptacle and the distal end of the shaft, the first and second channels each being sized and configured for passage therethrough of snare wires for adjusting tension on snare strainers.

7. The drum tuning stick as recited in claim 6 wherein each of the first, second and third tools comprises a chuck and a tool bit, wherein the tool bit may be selectively removed from the chuck by a user.

8. The drum tuning stick as recited in claim 6 further comprising a strap member that is structured and disposed for releasably securing the multi-tool tuning key in the tuning key receptacle for storage.

9. The drum tuning stick as recited in claim 6 further comprising an enlarged tip section located at the distal end of the shaft.

10. The drum tuning stick as recited in claim 6 wherein the first chuck is a ¼" chuck.

11. The drum tuning stick as recited in claim 6 wherein the second chuck is a ¼" chuck.

12. The drum tuning stick as recited in claim 6 wherein the third chuck is a ¼" chuck.

13. The drum tuning stick as recited in claim 6 wherein the tool bit comprises a screwdriver head or a socket.

14. A drum tuning stick comprising:

a shaft having a proximal end and a distal end;

a grip section located near the proximal end of the shaft;

a multi-tool tuning key including a tuning key; and a receptacle formed at the grip section, the receptacle being sized and configured for receiving the multi-tool tuning key.

15. The drum tuning stick as recited in claim 14 further comprising a first tool, a second tool and a third tool extending therefrom.

16. The drum tuning stick as recited in claim 14 further comprising a strap member that is structured and disposed for releasably securing the multi-tool tuning key in the tuning key receptacle for storage.

17. The drum tuning stick as recited in claim 14 further comprising a notch formed at the proximal end of the shaft, the notch being structured and disposed for loosening wingnuts.

18. The drum tuning stick as recited in claim 14 further comprising a first channel and a second channel formed on the shaft between the tuning key receptacle and the distal end of the shaft, the first and second channels each being sized and configured for passage therethrough of snare wires for adjusting tension on snare strainers.

* * * * *